Patented Oct. 8, 1940

2,217,263

UNITED STATES PATENT OFFICE 2,217,263

PROCESS FOR CONDUCTING EXOTHERMIC REACTIONS

Hein Israel Waterman, Jacob Jan Leendertse, and Willem Johannes Cornelis de Kok, Westvest, Delft, Netherlands, assignors to Shell Development Company, San Francisco, Calif., a corporation of Delaware No Drawing. Application May 2, 1939, Serial No. 273,084. In the Netherlands May 6, 1938

7 Claims. (Cl. 260—645)

This invention relates to methods for carrying out chemical reactions, particularly exothermic chemical reactions, between reactants in the liquid state, and especially to the manufacture of nitration products of organic compounds and like processes in which careful control of reaction conditions is essential in order that undesirable side reactions be avoided. It provides a novel procedure whereby such reactions may be carried out at high throughput rates without danger of side reactions, particularly decomposition reactions.

In the nitration of organic compounds, particularly aromatic compounds, great care must be exercised to prevent local overheating and consequent risk of explosion. In order to minimize the danger of such an explosion taking place, it has been customary in the past to carry out the nitration slowly in the presence of reacted mixture so that, while only comparatively small amounts of nitrated products are produced at a time, nevertheless relatively large amounts have to be present in the reactor at all times. This means not only a high investment in nitrating equipment, but also that the danger attending an explosion is very great because of the volume of explosive material involved.

We have found a method whereby these disadvantages may be overcome and organic compounds may be continuously nitrated at high throughput rates under accurately controlled conditions at which both the danger of explosion and the amount of explosive present are small. While our process is thus particularly advantageous in nitration reactions where the risks due to explosion are very great, it will be understood that it may also be applied to other reactions between liquid reactants, particularly other exothermic reactions, with resulting advantage.

The process of our invention comprises causing a reactant, e. g., an organic compound to be nitrated, to flow, preferably continuously, in a thin layer along a surface which is cooled or heated on the other side, as required, and bringing the other reactant, for example the nitrating agent, into contact therewith so that the reaction takes place only in a very thin layer in heat transfer relationship with the temperature regulating medium. Thus an accurate control of the reaction temperature is achieved which prevents overheating, particularly local superheating, and consequently removes the danger of explosion. Moreover, exceedingly small amounts of the reaction products are present in the reactor at any time so that even if an explosion should occur during nitration or the like, which is extremely unlikely in view of the ease of control possible by this method of operation, its force will be relatively small.

Another advantage of our process is that the reaction proceeds much more rapidly than is possible by prior methods so that a much larger amount of product can be obtained in unit time from a given reactor volume. Furthermore, due both to the reduction in reaction time and to the elimination of temperature fluctuations, undesirable side reactions may be avoided with consequent increase in ultimate yield. Also the process has the advantage of being readily adapted to continuous operation.

While the reaction may in general be carried out in any suitable apparatus in which a thin layer of liquid can be passed over a surface and another reactant introduced therein while passing a temperature regulating medium in contact with the opposite side of such surface, we prefer, because of its simplicity and ease of construction and operation, to use a vertical tube or tubes along one surface of which one of the liquid reactants is conducted. Most preferably, externally cooled or heated reaction tubes are used along the inner surface of which the reaction film is caused to flow. With such a reaction tube, the second reactant may advantageously be introduced into the thin layer of other reactant by spraying, or more preferably, by being hurled into the film by means of a rapidly rotating distributor head on which the reactant may be dropped in regulated amounts from a suitable supply pipe or tube. The initial film may be similarly formed by means of a rotating distributor placed higher in the reaction tube and to which the other liquid reactant may be fed by a separate supply line or by a simple overflow arrangement such, for example, as an annular trough or gutter attached to the outside of the reaction tube below its upper end and forming a wall which is higher than the reaction tube so that liquid fed thereto will flow over the edge of the reaction tube and down the inside as a uniform film. The same result may be attained by other suitable types of liquid-distributors which may also advantageously be used for applying temperature regulating liquid to the opposite side of the surface on which the reaction mixture is passed.

The conditions under which the process of our invention may be operated may be varied widely to meet the varying requirements of the wide range of reactants to which it is applicable. The temperature of different parts of the reacting film may be maintained the same or a predetermined temperature gradient along the path of flow of the reaction mixture may be provided. Thus in certain cases it may be desirable to provide heating at one end of the reaction tube and cooling at the other end, as, for example, where heating is useful for promoting completion of a reaction which may be cooled during its early stages to prevent undesirable side reactions or the like. Alternatively heating to initiate reaction followed by cooling to insure its control may be used. For the control of exothermic reactions, cooling water or a refrigerant such, for example, as cooled brine or liquid ammonia or pentane or other cooling agents may be used and whether or not the cooling fluid is applied in film form or in bulk provision may be made for the removal of heat by evaporation of cooling fluid or solely as sensible heat or both. Advantageously, provision may be made for regulating the pressure on the temperature regulating medium as an aid in accurate control. Thus vacuum or superatmospheric pressure may be applied to the cooling medium, for example, so as to maintain it at a boiling temperature capable of insuring the desired temperature in the reaction layer.

The length of reaction surface to be used in any particular case will be governed by the time required for the reaction. Instead of completing the reaction in one passage over a surface cooled or heated on the other side, a plurality of successive surfaces may be used and reaction product and/or other components of the mixture may be separated between the different stages. Also, one or more of the reactants may be introduced at more than one point in the system whether or not a unitary reactor is employed.

In order to promote intimate mixing of the reactants, it is advantageous to feed the reactants, most preferably including the initial film forming liquid itself, at such a rate that a turbulent flowing film is obtained. The intimate mixing obtained by using a turbulent film greatly accelerates the rate of reaction, and the consequent reduction in reaction time materially contributes to the suppression of side reactions. Also turbulence in the liquid film promotes a high rate of heat transfer which facilitates accurate temperature control, also contributing to the elimination of undesirable side reactions, particularly decomposition reactions. The more viscous the liquid, the higher the flow rate which will be required in order to obtain turbulent flow. Flow rates below the limit of turbulence may be used where other considerations outweigh the advantages of turbulent flow, but in all cases a practical lower limiting rate exists below which channelling of the liquid occurs and the reaction surface is not covered with a uniform layer so that proper distribution of the second reactant becomes difficult. We also prefer to avoid high rates of flow which give liquid layers too thick for adequate heat transfer and proper mixing of reactants. Such undesirable layers are particularly apt to be formed where inclined surfaces are used for carrying out the reaction unless proper care is taken to avoid them, but they may also be encountered at too high flow rates in vertical tube type reactors where they may be detected by the tendency of the liquid to become detached in part from the wall or to even fill the column at least in sections. By imparting to the liquid a velocity component normal or inclined to the surface to be traversed by the film, as by a properly directed stream or spray or by passing the liquid to be distributed over a weir and then through a narrow passage where the film is formed, films of desirable uniform thickness capable of sustaining the required velocity may advantageously be produced.

Any suitable method of recovering the reaction products may be used. While particularly adapted to continuous operation, our process may also be carried out batchwise or intermittently. The reactions to which it is applicable may be conducted under atmospheric or higher or lower pressures as is most desirable.

The following example of the application of the process of our invention to the nitration of benzene illustrates its advantages over prior nitration methods.

On the inner surface of a reaction tube 70 centimeters long and having an inner surface of about 1200 square centimeters, a thin layer of benzene was applied with the aid of a rapidly rotating distributor disk. The reaction tube was surrounded by a water jacket which maintained the outside of the tube at a temperature of 60°–80° C. A few centimeters below the point of benzene admission, nitrating acid, a mixture of sulfuric and nitric acids, was hurled into the benzene layer by means of a similar distributor. The point at which the nitrating acid came into contact with the benzene was below the level of water in the jacket surrounding the reaction tube. The reaction mixture was collected at the bottom of the tube after it had flowed down the wall surface. During collection, the mixture split up at once into two sharply defined liquid layers which were promptly separated.

In one case 295 grams (334 cc.) of benzene were passed through the reactor with an excess of nitrating acid, namely, 1131 grams of a mixture of 2.67 liters of nitric acid (sp. gr. 1.44) and 3.30 liters of sulfuric acid of 1.84 specific gravity. The benzene and nitrating acid were passed through the apparatus in 10 minutes. The nitrobenzene layer was separated and the crude nitrobenzene obtained therefrom was subjected to distillation and more than 423 grams of nitrobenzene free from unreacted benzene was thus obtained. This corresponds to a recovered yield of more than 91%.

In an experiment carried out according to prior art teachings in which a three-necked flask, equipped with a stirrer and a thermometer and immersed in a water bath was used, 378 grams of benzene were used and 993 grams of nitrating acid were added thereto. The water bath was kept at about 30° C. and the reaction temperature was 55°–60° C. Under these conditions, 65 minutes was the minimum time in which the acid could be added without raising the reaction temperature. The yield of crude nitrobenzene was 553 grams compared to a theoretical yield of 596 grams. On distillation, this product was found to contain about 2% of unreacted benzene and the properties of the remainder indicated the presence of a few percent of dinitrobenzene. The yield of nitrobenzene was therefore about 90%. In an attempt to shorten the excessive reaction time required in the conventional nitration method, another experiment was carried out using ice cooling and a reaction temperature of about 60° to 80°, mostly 70°–80° C. Under these conditions, 1113 grams of nitrating acid were added to 300 grams of benzene in 21 minutes, but the fluctuations in temperature were great and often very abrupt, showing that the rate of acid addition employed was greater than is compatible with safe operation and would not be permissible in plant scale operation.

These comparative examples clearly demonstrate the superiority of the process of our invention, particularly in more than doubling the production rate and in greatly reducing the risk of explosion while giving an approximately equal yield.

Equally good results may be obtained in the nitration of other organic compounds, particularly in the preparation of polynitrobenzenes, nitrotoluenes, nitroglycerines, and the like where the explosion hazards are even greater. The organic compound to be nitrated may be used in pure liquid form or in admixture with other materials or as a solution or suspension in a suitable liquid which may be inert under the reaction conditions or which may itself undergo nitration or other reaction or change which does not interfere with the desired reaction. Instead of the nitrating acid described, other appropriate nitrating agents, such, for example, as mixtures of nitric acid with other dehydrating acids as oleum, acetic anhydride, phosphorus pentoxide, etc., or alkali nitrates in the presence of sulfuric acid, or organic nitrates such as acetyl or benzoyl nitrates, or nitrosulfonic acid or the like, may be used.

I. will be evident that our process offers many advantages, particularly with respect to efficiency and plant capacity and safety, over prior nitration methods. The smoothness of operation, resulting from the use of our reaction procedure contributes materially to the reduction of labor and supervision expense. Furthermore, by providing simple and accurate temperature control, our process simplifies recovery and particularly purification of the reaction product by reducing the amount of impurities, especially higher nitration products, which are formed.

While the process of our invention thus offers special and unexpected advantages of great importance in the nitration of organic compounds, including in addition to the examples already described, the nitration of phenols, amines, particularly aniline, acetanilide, chlorbenzene, naphthalene and the like, it may also be applied to other reactions between reactants in the liquid state. Thus the diazotization of aniline hydrochloride by means of sodium nitrite in the presence of aqueous hydrochloric acid or the sulfonation of aromatic or aliphatic hydrocarbons in the liquid state or the alkylation of aromatic or branched chain aliphatic hydrocarbons by means of olefines in the presence of sulfuric acid or aluminum chloride or the like may be similarly carried out.

Our invention is capable of wide variation not only in regard to the different reactions to which it may be applied and the conditions under which they may be conducted, but also with respect to the method of operation employed. For example, temperature control in the reaction layer by means of indirect heat transfer through the reaction surface to a temperature regulating fluid on the opposite side may be supplemented by suitable preheating or precooling of either or both of the reactants separately. Also diluents, such for example, as spent nitrating acid in the case of nitrations, or materials which vaporize under the desired reaction conditions or other temperature regulating means may be employed in connection with the previously described preferred temperature control system. Catalysts, dissolved or suspended in either or both of the liquid reactants or deposited on the reaction surface may be used to further accelerate or to modify the reaction. Still other modifications may be made in the process of our invention, which will therefore be understood as not being limited to the details of operation described, nor by any theory advanced in explanation of the improved results attained, but only by the terms of the accompanying claims in which it is our intention to claim all novelty inherent therein as broadly as possible in view of the prior art.

We claim as our invention:

1. A process of producing nitrobenzene which comprises flowing a thin film of benzene under gravity down the inner surface of a heat conducting tube, hurling a nitrating mixture of sulfuric and nitric acids into said film, conducting the resulting mixture as a thin film along said inner surface until substantial nitration of benzene is effected and passing a cooling fluid in contact with the opposite side of the surface on which reacting mixture is present, whereby heat generated by said reaction is removed from the film substantially as generated.

2. The process of claim 1 in which the reactants are fed at such a rate that the resulting film of liquid flows in turbulent motion.

3. A process of nitrating an aromatic hydrocarbon which comprises introducing a nitrating acid mixture into a thin substantially unbroken flowing liquid layer comprising said hydrocarbon, conducting the resulting mixture as a thin film in heat exchange relation with a temperature regulating medium, stratifying the resulting liquid reaction products and separating the layer containing the aromatic nitro compound.

4. A process of producing an organic nitro compound which comprises flowing a thin liquid layer comprising an organic compound capable of nitration over a heat conducting surface, introducing a nitrating agent into said liquid layer and passing a temperature regulating liquid in contact with the opposite side of said surface whereby a substantially constant reaction temperature is maintained in the resulting liquid layer of reaction mixture until substantial nitration is effected.

5. A process of conducting an exothermic organic chemical reaction between reactants in the liquid state which comprises flowing a thin layer of one of said reactants over a heat conducting surface, contacting cooling liquid with the opposite side of said surface and introducing the other reactant into said thin layer whereby heat generated by reaction in the resulting thin layer of mixture of concurrent flowing reactants is removed substantially as generated.

6. A process of conducting a chemical reaction between reactants in the liquid state which comprises flowing a thin substantially unbroken liquid layer of one of said reactants along the inner surface of a reaction tube, spraying the other reactant into said layer while contacting the opposite side of said tube with a temperature regulating liquid whereby substantially uniform reaction conditions are maintained in the thin flowing layer of reaction mixture.

7. A process of conducting a chemical reaction between reactants in the liquid state which comprises flowing a thin substantially unbroken liquid layer of one of said reactants over a heat conducting surface, introducing the other reactant into said thin layer while contacting the opposite side of said surface with a temperature regulating fluid whereby substantially uniform reaction conditions are maintained in the thin flowing layer of reaction mixture.

HEIN ISRAEL WATERMAN.
JACOB JAN LEENDERTSE.
WILLEM JOHANNES CORNELIS DE KOK.